US012655054B2

(12) United States Patent
Zhao et al.

(10) Patent No.: US 12,655,054 B2
(45) Date of Patent: Jun. 16, 2026

(54) METHOD FOR BENDING AND TEMPERING OF CURVED GLASS USING FLEXIBLE SHAFTS

(71) Applicant: LUOYANG LANDGLASS TECHNOLOGY CO., LTD., Luoyang (CN)

(72) Inventors: Yan Zhao, Luoyang (CN); Youcheng Zhu, Luoyang (CN); Xiaochen Cui, Luoyang (CN); Zhiyong Shi, Luoyang (CN)

(73) Assignee: Luoyang Landglass Technology Co., Ltd. (CN)

( * ) Notice: Subject to any disclaimer, the term of this patent is extended or adjusted under 35 U.S.C. 154(b) by 719 days.

(21) Appl. No.: 17/910,474

(22) PCT Filed: Mar. 4, 2021

(86) PCT No.: PCT/CN2021/079066
§ 371 (c)(1),
(2) Date: Sep. 9, 2022

(87) PCT Pub. No.: WO2021/179986
PCT Pub. Date: Sep. 16, 2021

(65) Prior Publication Data
US 2023/0136382 A1      May 4, 2023

(30) Foreign Application Priority Data

Mar. 13, 2020    (CN) ......................... 202010176356.6

(51) Int. Cl.
C03B 27/00        (2006.01)
C03B 23/025        (2006.01)
(Continued)

(52) U.S. Cl.
CPC .......... C03B 23/033 (2013.01); C03B 23/025 (2013.01); C03B 23/0254 (2013.01); (Continued)

(58) Field of Classification Search
CPC .......................... C03B 23/033; C03B 23/0254
See application file for complete search history.

(56) References Cited

U.S. PATENT DOCUMENTS 3,871,855 A      3/1975  Frank
4,226,608 A  *  10/1980  McKelvey ............ C03B 27/044
65/273
(Continued)

FOREIGN PATENT DOCUMENTS

CN        206173209 U  *  5/2017
CN        108545913 A      9/2018
(Continued)

OTHER PUBLICATIONS

CN-206173209-U (Han J) May 17, 2017 (English language machine translation). [online] [retrieved May 30, 2025]. Retrieved from: Clarivate Analytics. (Year: 2017).*
(Continued)

*Primary Examiner* — Erin Snelting
(74) *Attorney, Agent, or Firm* — DLA PIPER LLP US; Blake W. Jackson; Thomas J. Fuller

(57)        ABSTRACT

A method for bending and tempering of curved glass using flexible shafts is provided. During production of curved glass, after discharged from a heating furnace, glass is preformed with the two edge portions of the glass in the transverse direction being kept in the same plane and the middle portion of the glass in the transverse direction gradually sinks along the conveying direction. The glass then enters a forming and tempering section with the two edge portions in the transverse direction being supported and
(Continued)

is finally formed and tempered. In this method, when the glass gradually becomes curved and enters the forming and tempering section, the two edge portions of the glass in the transverse direction are always supported by flexible shaft roller beds, thereby preventing the edge portions from being dangled and avoiding the formation of wavy edge portions.

5 Claims, 6 Drawing Sheets

(51) Int. Cl.
| | |
|---|---|
| *C03B 23/033* | (2006.01) |
| *C03B 27/044* | (2006.01) |
| *C03B 35/16* | (2006.01) |
| *C03B 35/18* | (2006.01) |

(52) U.S. Cl.
CPC ............ *C03B 27/00* (2013.01); *C03B 27/044* (2013.01); *C03B 27/0447* (2013.01); *C03B 35/166* (2013.01); *C03B 35/187* (2013.01)

(56) References Cited

U.S. PATENT DOCUMENTS

| | | | | | |
|---|---|---|---|---|---|
| 4,556,406 | A | * | 12/1985 | Kahle | ................. C03B 23/0254 65/273 |
| 5,928,398 | A | * | 7/1999 | Lehto | .................... C03B 40/005 65/273 |
| 6,192,710 | B1 | * | 2/2001 | Takeda | ................. C03B 35/187 65/273 |
| 6,363,753 | B1 | * | 4/2002 | Yoshizawa | ............ C03B 35/185 492/50 |
| 6,397,634 | B1 | * | 6/2002 | Takeda | ................... C03B 35/166 65/102 |
| 2009/0229309 | A1 | * | 9/2009 | Nomura | .............. C03B 23/0254 65/273 |
| 2010/0218555 | A1 | * | 9/2010 | Tomioka | ............. C03B 23/0254 65/291 |

FOREIGN PATENT DOCUMENTS

| | | | | | |
|---|---|---|---|---|---|
| CN | 208430033 | U | | 1/2019 | |
| CN | 111302611 | A | | 6/2020 | |
| CN | 111348820 | A | | 6/2020 | |
| CN | 111423103 | A | | 7/2020 | |
| CN | 111453978 | A | | 7/2020 | |
| CN | 211999461 | U | | 11/2020 | |
| JP | 2004059401 | A | * | 2/2004 | ......... C03B 23/0254 |

OTHER PUBLICATIONS

JP-2004059401-A (Nemugaki Y) Feb. 26, 2004 (English language machine translation). [online] [retrieved May 30, 2025]. Retrieved from: Clarivate Analytics. (Year: 2004).*

CN-108545813-A (Han) Sep. 18, 2018 (English language machine translation). [online] [retrieved May 28, 2025]. Retrieved from: Espacenet. (Year: 2018).*

International Search Report issued in corresponding International Patent Application No. PCT/CN2021/079066 dated Jun. 4, 2021.

\* cited by examiner

METHOD FOR BENDING AND TEMPERING OF CURVED GLASS USING FLEXIBLE SHAFTS

CROSS-REFERENCED APPLICATIONS

This application is a U.S. national phase entry under 35 U.S.C. § 371 from PCT International Application No. PCT/CN2021/079066 filed on Mar. 4, 2021, which is based upon and claims the benefit of priority from the prior Chinese Patent Application No. 202010176356.6 filed on Mar. 13, 2020. The entire contents of the above applications are incorporated herein by reference.

TECHNICAL FIELD

The present disclosure relates to the technical field of glass tempering, and in particular, to a method for bending and tempering of curved glass using flexible shafts.

BACKGROUND TECHNOLOGY

At present, during the manufacturing of oversized curved tempered glass (including double curved glass and single curved glass), glass with a large size needs to be formed by transitioning and forming. However, during the transitioning and forming, the middle portion is usually kept horizontal and the edge portions are gradually transitioned upward. That is to say, when the flexible shaft roller beds become curved in a transition section, the middle portion is not moved and is kept horizontal, and the two end portions gradually become curved. In the forming and tempering section connected to the transition section, the forming and tempering section is required to be raised or lowered to cause the roller bed surface of the flexible shaft roller beds to be level with the middle portion of the roller bed surface of the transition section, to receive the glass after the transitioning and forming. The flexible shaft roller beds in the forming and tempering section, at least at the inlet position, are only curved in the transverse direction, but not curved in the longitudinal direction. Therefore, if the end portions of these flexible shaft roller beds form a horizontal straight line, and edge portions of the glass move in the horizontal direction. However, in the transition section, the end portions of the flexible shaft roller beds form an inclined upward slope, and the edge portions of the glass move obliquely upward. Therefore, during the movement of the glass from the transition section to the forming and tempering section, the edge portions of the glass are required to move on such a broken line composed of oblique lines and horizontal lines. At a transition point of the broken line (that is, an engagement position between the transition section and the forming and tempering section), the edge portions of the glass easily become dangled without being supported during moving. Consequently, wavy edges of the glass are caused, the glass cannot be formed, and requirements for dimensional accuracy cannot be satisfied.

SUMMARY

The present disclosure is intended to provide a method for bending and tempering of curved glass using flexible shafts, so as to eliminate the foregoing phenomena of the transition point and the dangled glass, and resolve the technical problem that edge portions are difficult to form.

In order to achieve the objective, the present disclosure adopts the following technical solutions. A method for bending and tempering of curved glass using flexible shafts is provided. After glass is discharged from a heating furnace, the glass is preformed in a trend that two edge portions of the glass in a transverse direction are kept in the same plane and the middle portion of the glass in the transverse direction gradually sinks along the conveying direction. The glass then enters the forming and tempering section with the two edge portions in the transverse direction being supported, and is eventually formed and tempered, thereby finishing bending and tempering of the curved glass.

To implement the foregoing method, specific steps may be performed as follows:

Step I: Adjust the transition section, so that flexible shaft roller beds of the transition section gradually become curved, the end portions of the flexible shaft roller beds forming a roller bed surface of the transition section are in the same plane, and the middle portions of the flexible shaft roller beds in the axial direction are gradually lowered along the glass conveying direction.

Step II: Adjust a forming and curving mechanism of the forming and tempering section, so that the flexible shaft roller beds of the forming and tempering section become curved, and the flexible shaft roller bed at the inlet end of the roller bed surface of the forming and tempering section is smoothly engaged with the flexible shaft roller bed at the outlet end of the roller bed surface of the transition section, to ensure that the two edge portions of the glass in the transverse direction are supported by the flexible shaft roller beds when a softened glass enters the forming and tempering section from the transition section.

Step III: Feed the glass into the heating furnace for heating to a softened state and then discharge the glass from the heating furnace. The discharged glass enters the transition section and gradually becomes curved through the flexible shaft roller beds that have gradually become curved, then the two edge portions of the glass in the transverse direction are kept supported, and the glass is brought into the forming and tempering section for final formation and tempering, to finish bending and tempering of the glass.

When the above steps are performed, there are two scenarios, where the roller bed surface of the transition section can rotate in one scenario and cannot rotate in the other scenario.

1. When the roller bed surface of the transition section cannot rotate, in the transition section, a support for mounting the flexible shaft roller beds is inclined, so that after the flexible shaft roller beds in the transition section become curved, the end portions of the flexible shaft roller beds are in the same plane, and the middle portions of the flexible shaft roller beds in the axial direction are gradually lowered in the glass conveying direction.

When the roller bed surface of the transition section cannot rotate, further in step I, the flexible shaft roller beds of the transition section gradually become curved in the transverse direction by a transitioning and curve forming mechanism.

When the roller bed surface of the transition section cannot rotate, further in step II, the forming and curving mechanism includes a transverse curve forming mechanism, and the flexible shaft roller beds of the forming and tempering section become curved in the transverse direction by the transverse curve forming mechanism.

When the roller bed surface of the transition section cannot rotate, further, the forming and curving mechanism includes a transverse curve forming mechanism and a longitudinal curve forming mechanism. The flexible shaft roller beds of the forming and tempering section become curved in the transverse direction by the transverse curve forming mechanism, and the plurality of flexible shaft roller beds on the outlet side of the forming and tempering section become curved in the longitudinal direction by the longitudinal curve forming mechanism, so that the roller bed surface on the outlet side of the forming and tempering section is pre-formed into a spherical surface for carrying the glass.

2. When the roller bed surface of the transition section can rotate, in step I of the above method, after the flexible shaft roller beds of the transitioning and curve forming mechanism become curved, the roller bed surface of the transition section is rotated, so that the end portions of the flexible shaft roller beds are in the same plane, and the middle portions of the flexible shaft roller beds in the axial direction are gradually lowered in the glass conveying direction. In step II, after the flexible shaft roller beds of the forming and tempering section become curved, the roller bed surface of the forming and tempering section is raised or lowered, so that the last flexible shaft roller bed in the transition section and a first flexible shaft roller bed in the forming and tempering section are smoothly engaged.

In step I, the flexible shaft roller beds of the transition section gradually become curved in the transverse direction by the transitioning and curve forming mechanism. And before and after the flexible shaft roller beds gradually become curved, two end portions of the flexible shaft roller beds in the length direction are always in the same horizontal plane in the glass conveying direction, and the middle portions of the flexible shaft roller beds are gradually lowered.

Further, in a case that the foregoing transition section gradually becomes curved in the transverse direction, there are a plurality of manners for the roller beds of the forming and tempering section to become curved, which are specifically as follows:

1. In step II, the forming and curving mechanism includes a transverse curve forming mechanism, and the flexible shaft roller beds of the forming and tempering section become curved in the transverse direction by the transverse curve forming mechanism.

2. In step II, the forming and curving mechanism includes a transverse curve forming mechanism and a longitudinal curve forming mechanism. The flexible shaft roller beds of the forming and tempering section become curved in the transverse direction by the transverse curve forming mechanism, and the plurality of flexible shaft roller beds on the inlet side or the outlet side of the forming and tempering section become curved in the longitudinal direction by the longitudinal curve forming mechanism.

3. In step II, the forming and curving mechanism includes a transverse curve forming mechanism and a longitudinal curve forming mechanism. The flexible shaft roller beds in the forming and tempering section become curved in the transverse direction and the longitudinal direction through the transverse curve forming mechanism and the longitudinal curve forming mechanism, so that the roller bed surface of the forming and tempering section forms a spherical surface for carrying the glass.

Further, in step II, an upper air grid in the forming and tempering section becomes curved in the transverse direction, or the upper air grid in the forming and tempering section becomes curved in both the transverse direction and the longitudinal direction.

When the flexible shaft roller beds of the transition section become curved in the transverse direction, its first flexible shaft roller bed is level with a roller bed of the heating furnace, and its last flexible shaft roller bed has the same transverse curvature as the flexible shaft roller beds in the forming and tempering section after becoming curved in the transverse direction.

Beneficial effects of the present disclosure are as follows. According to the present disclosure, a state of the glass passing through the transition section is optimized, so that heights of two end portions of the glass in the transverse direction (that is, perpendicular to the glass conveying direction) remain unchanged, while the middle portion of the glass in the transverse direction gradually sinks. A device basis for realizing the state is that the end portions of the flexible shaft roller beds forming the roller bed surface on the transition section are in the same plane (the plane is flush with the end portions of the flexible shaft roller beds in the forming and tempering section), and the middle portions of the flexible shaft roller beds in the axial direction are gradually lowered in the glass conveying direction. The roller bed surface in this state may be summarized as "the edge portion not moving and the middle portion sinking." In this way, when the glass transitions from the transition section to the forming and tempering section, the two edge portions of the glass in the transverse direction can be always supported by the flexible shaft roller beds, and the edge portions are not dangled, so as to solve the technical problem that the edge portions of the glass are difficult to form.

For the flexible shaft roller bed of the transition section, the present disclosure provides two structural forms for implementation. The first one is a fixed structure, that is, the support for mounting the flexible shaft roller beds is inclined, and the roller bed surface with "the edge portion not moving and the middle portion sinking" is formed after the flexible shaft roller beds becomes curved. The second one is a rotary structure, that is, the support for mounting the flexible shaft roller beds is rotatable up and down, so that the roller bed surface with "the edge portion not moving and the middle portion sinking" may also be formed through rotation.

No matter what form of transition section is adopted, the forming and tempering section is required to have a function of raising or lowering the roller bed surface. The function is a mature conventional technology in the field of glass bending and tempering.

After the method of the present disclosure is adopted, there are more possibilities that the flexible shaft roller beds of the transition section and the forming and tempering section become curved. In this way, a glass manufacturer can make flexible adjustments according to customer requirements and conditions, which facilitates improvement in production efficiency and glass quality.

Figure 1:
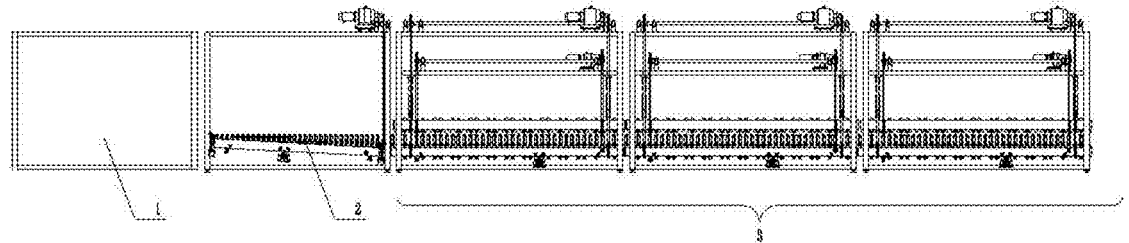
FIG. 1 is a schematic structural diagram of a device used in the present disclosure.

Reference Numerals: 1. Heating furnace, 2. Transition section, 3. Forming and tempering section, 4. Main rack, 5. Auxiliary rack, 6. Transmission shaft, 7. Motor, 8. Driving wheel, 9. Flexible shaft roller bed, 10. Aluminum profile square tube, 11. Transitioning and curve forming mechanism, 12. Pressing wheel mechanism, 13. Auxiliary heating section, 14. Crank, 15. Chain, 16. Lug, 17. Manual driving apparatus, 18. Lifting apparatus, 19. Hinge mechanism, 20. Pressing wheel, 21. Spherical hinge, 22. Chain plate structure, 23. Intermediate support, 24. Connecting body, 25. Ceramic roller bed, 26. End portion of flexible shaft roller bed, 27. Middle portion of flexible shaft roller bed.

DETAILED DESCRIPTION

The present disclosure is further described in detail below with reference to the accompanying drawings and embodiments, which are not used as a basis for limiting the present disclosure.

A method for bending and tempering of curved glass using flexible shafts is provided. The method is performed with the cooperation of rotation of a roller bed surface in the transition section and raising and lowering of a roller bed surface in a forming and tempering section, including the following steps:

Step I: Adjust a transitioning and curve forming mechanism of a transition section, so that flexible shaft roller beds of the transition section gradually become curved.

Step II: Rotate the roller bed surface of the transition section, so that end portions of the flexible shaft roller beds are in the same plane, and middle portions of the flexible shaft roller bed in the axial direction are gradually lowered along the glass conveying direction.

Step III: Adjust a forming and curving mechanism of the forming and tempering section, so that the flexible shaft roller beds of the forming and tempering section become curved.

Step IV: Raise or lower the roller bed surface of the forming and tempering section, so that the last flexible shaft roller bed in the transition section and the first flexible shaft roller bed in the forming and tempering section are smoothly engaged, to ensure that when a softened glass enters from the transition section to the forming and tempering section, two edge portions of the glass in a transverse direction can be supported by the flexible shaft roller beds.

Step V: Feed the glass into the heating furnace for heating to a softened state and then discharge the glass from the heating furnace. The discharged glass enters the transition section and gradually becomes curved through the flexible shaft roller beds that have gradually become curved, then maintains the two edge portions of the glass in the transverse direction supported, and brings the glass into the forming and tempering section for final formation and tempering, to finish bending and tempering of the glass.

A bending and tempering device using flexible shafts for realizing the above method according to the present disclosure includes a heating furnace 1, a transition section 2, and a forming and tempering section 3 arranged in sequence according to the process, as shown in FIG. 1. Ceramic roller beds of the heating furnace 1 constitute a plane supporting the glass. A structure of the forming and tempering section 3 is the same as a forming and tempering section in a current glass bending and tempering device, which belongs to the category of conventional technologies, and details are not described herein. The transition section 2 is a rotary transition section, and the roller bed surface of the transition section may rotate up and down within a certain range. Flexible shaft roller beds and a forming and curving mechanism of the forming and tempering section 3 can be raised or lowered as a whole, which belongs to the conventional technology in the art. Therefore, only the structure of the transition section 2 is described in detail below.

Figure 2:
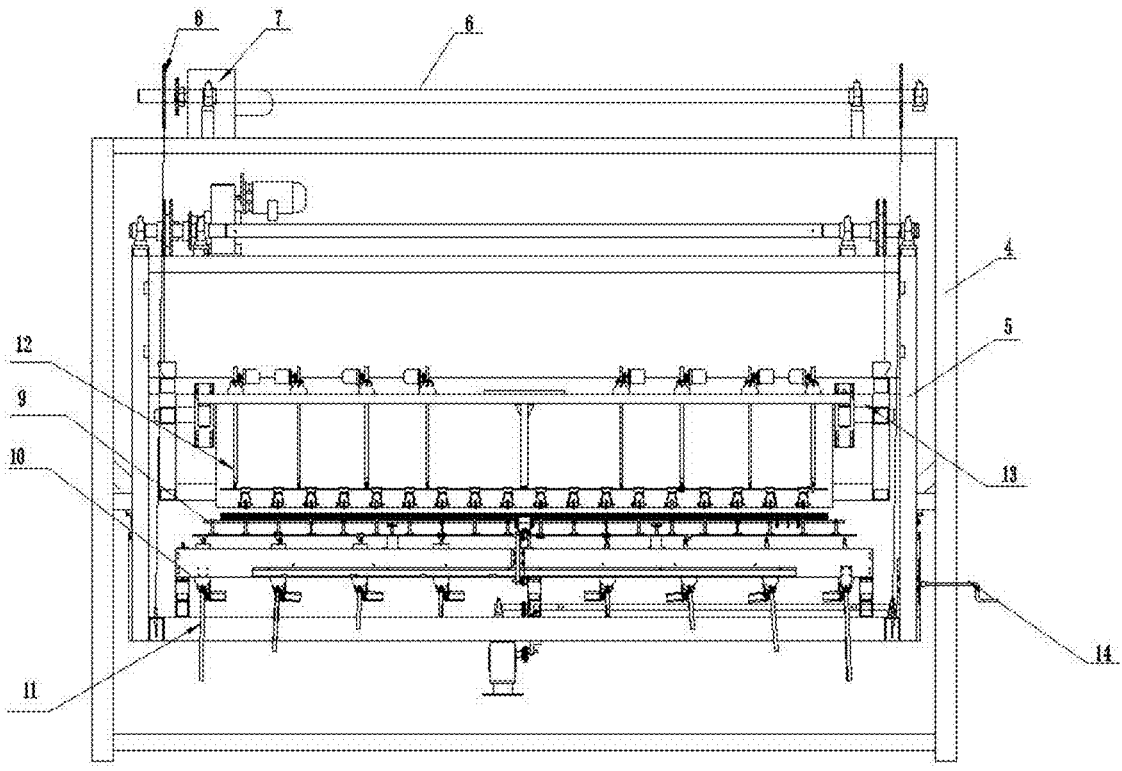
FIG. 2 is a schematic structural diagram of a transition section.
Figure 3:
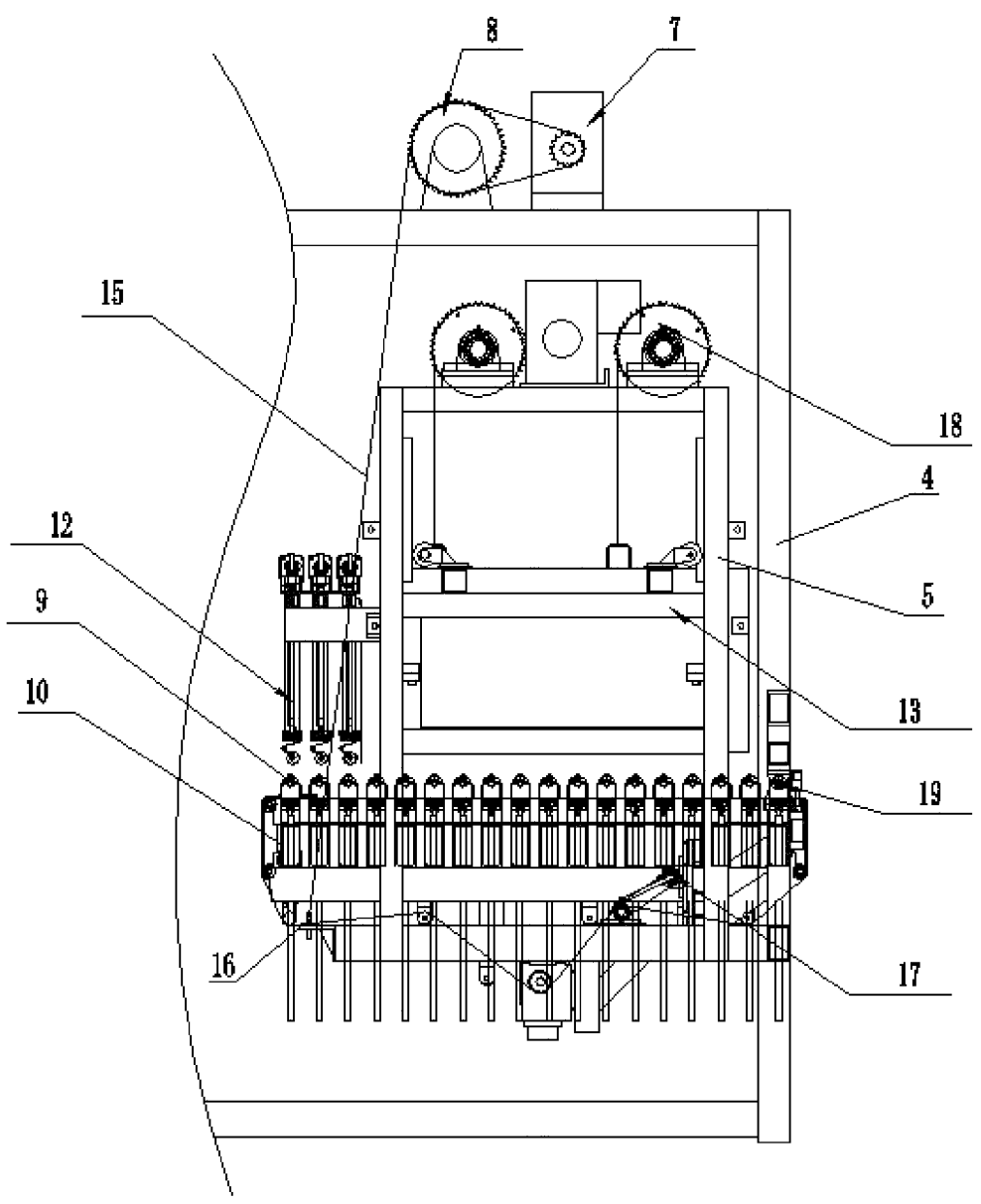
FIG. 3 is a side view of a transition section.

Embodiment 1: As shown in FIG. 2 and FIG. 3, the transition section 2 includes a main rack 4 and an auxiliary rack 5. A plurality of aluminum profile square tubes 10 are fixedly arranged at intervals on the auxiliary rack 5 along the glass conveying direction. One parallel flexible shaft roller bed 9 is correspondingly arranged above each aluminum profile square tube 10, and the flexible shaft roller bed 9 becomes curved by a corresponding transitioning and curve forming mechanism 11. A roller bed surface formed by the plurality of flexible shaft roller beds 9 in a linear state is coplanar with a roller bed surface in the heating furnace 1. An end of the auxiliary rack 5 close to the heating furnace 1 is rotatably connected to the main rack 4 in a hinged manner, with a rotating axis being collinear with the central axis of the first flexible shaft roller bed 9 in the linear state and being parallel to ceramic roller beds 25 of the heating furnace 1. The hinging is realized by using a hinge mechanism 19, such as a hinge pin. An end of the auxiliary rack 5 away from the heating furnace 1 is connected to a traction mechanism arranged on the main rack 4.

The traction mechanism includes a motor 7, a driving wheel 8, a chain 15, and a transmission shaft 6. The motor 7 and the transmission shaft 6 are both mounted to the top of the main rack 4. The transmission shaft 6 is driven by the motor 7 to rotate. The driving wheels 8 are mounted to two ends of the transmission shaft 6, and the driving wheels 8 are configured to pull the auxiliary rack 5 through the chain 15. Lower ends of the two chains 15 may be connected to lugs 16 on two sides of the auxiliary rack 5 in the width direction.

Figure 4:
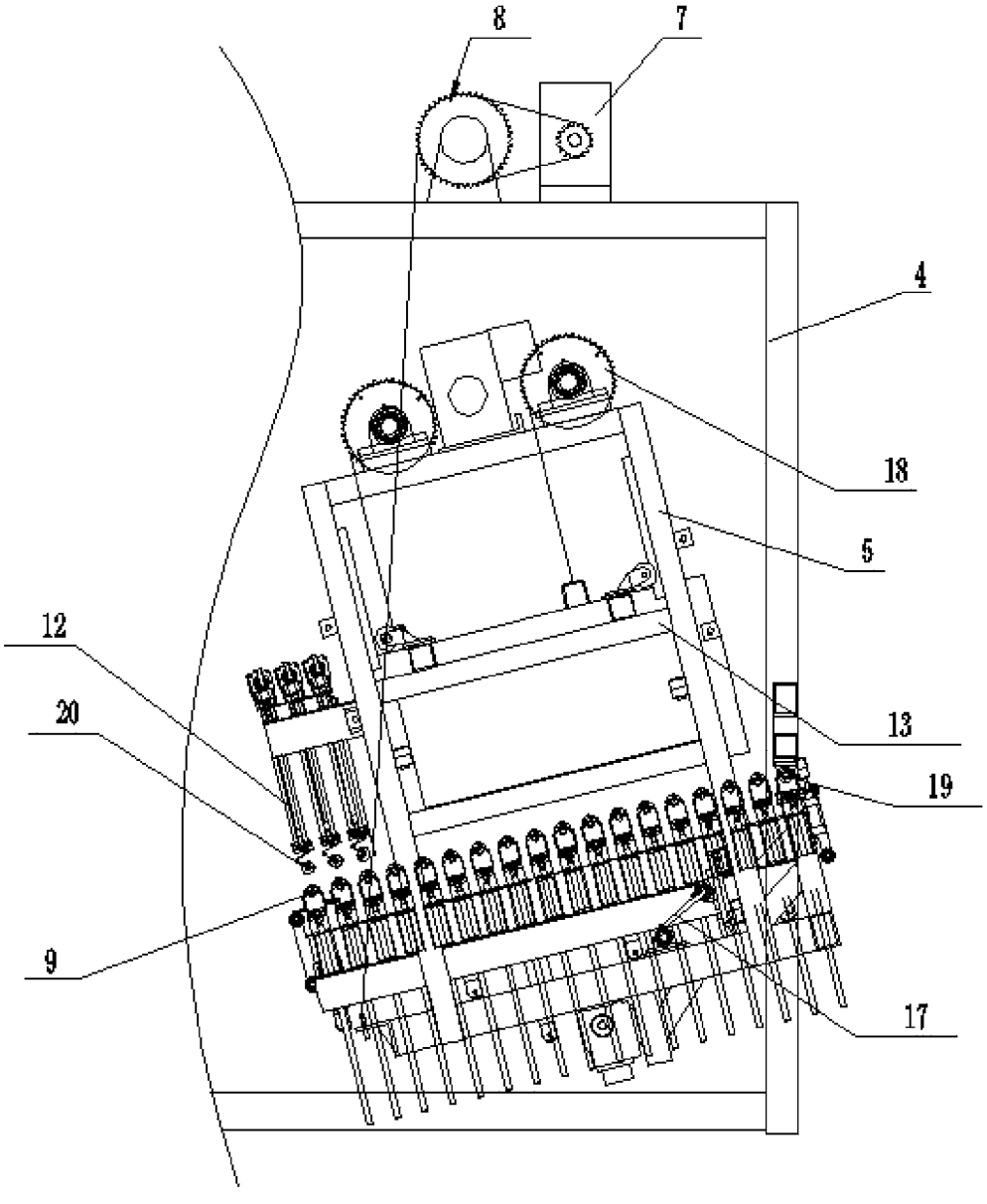
FIG. 4 is a schematic diagram of an auxiliary rack after rotating downward in a transition section.
Figure 5:
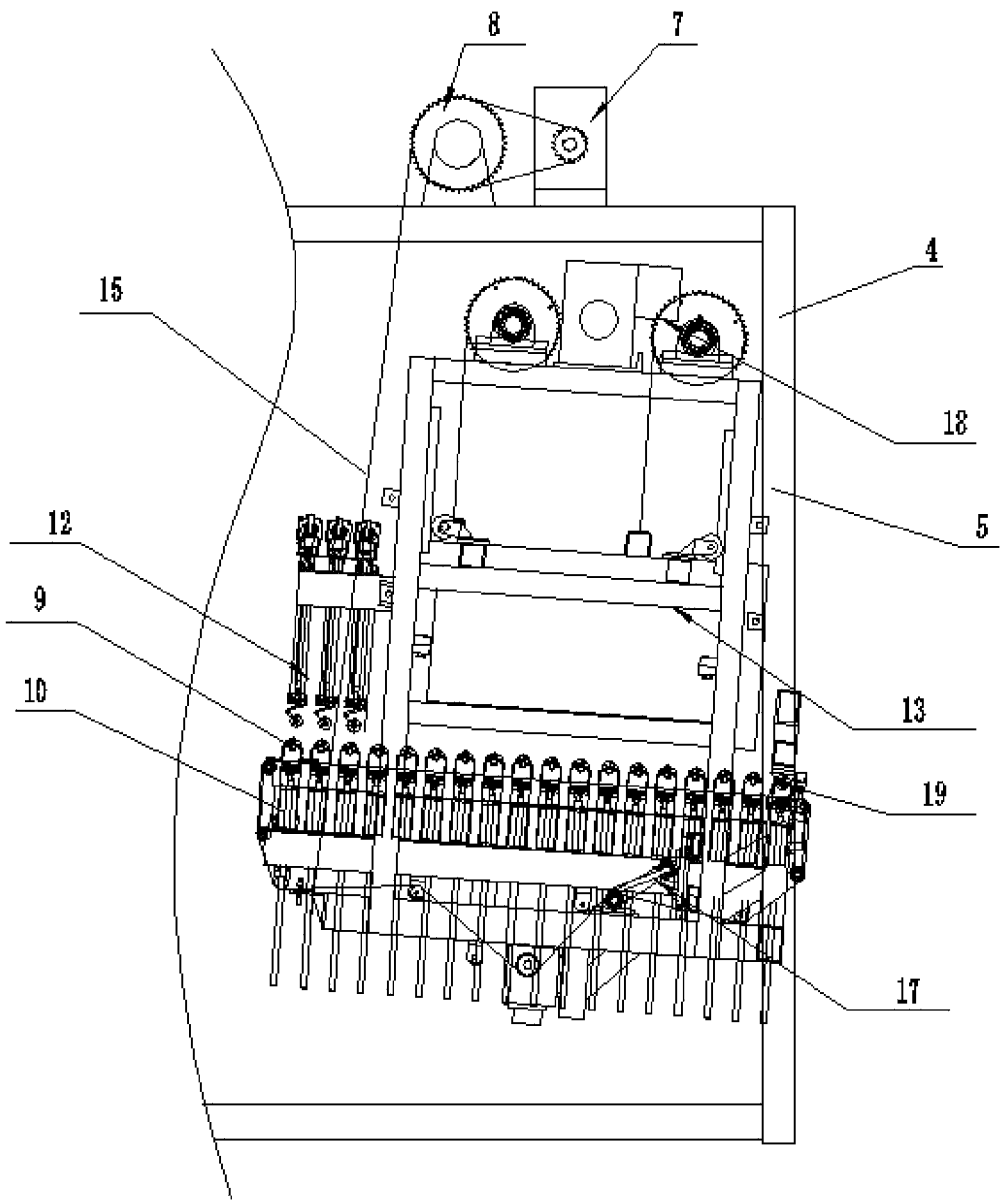
FIG. 5 is a schematic diagram of an auxiliary rack after rotating upward in a transition section.
Figure 6:
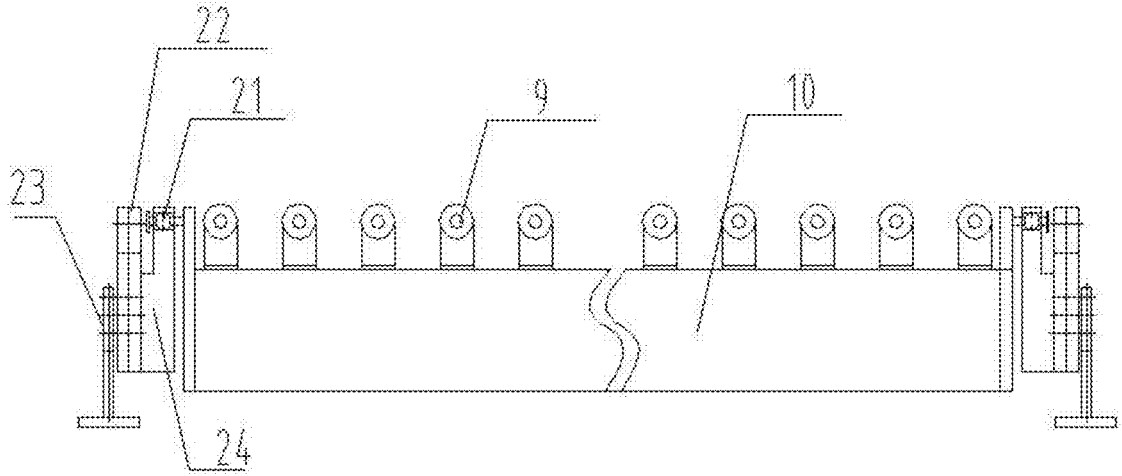
FIG. 6 is a structural schematic diagram of a transitioning and curve forming mechanism and a profile hinge.

When the auxiliary rack 5 is required to rotate, the chain 15 is pulled by the motor 7, and the auxiliary rack 5 may be rotated upward, as shown in FIG. 5. When the motor 7 is reversed and the chain 15 is released, the auxiliary rack 5 rotates downward, as shown in FIG. 4. FIG. 4 and FIG. 5 only show a diagram of a state in which the auxiliary rack 5 rotates. The flexible shaft roller beds 9 do not become curved. In actual use, the flexible shaft roller beds 9 are required to first become curved, and then the auxiliary rack 5 is rotated, so as to realize engagement between the last flexible shaft roller bed 9 and the forming and tempering section 3.

The flexible shaft roller beds 9 become curved by the transitioning and curve forming mechanism 11. The transitioning and curve forming mechanism 11 includes elastomers and a height adjustment mechanism. The flexible shaft roller beds 9 are parallel to the elastomers, and are mounted to the elastomers through flexible shaft bases. Middle portions of the elastomers are fixed to the aluminum profile square tubes 10. The height adjustment mechanism is symmetrically arranged on two sides of a fixed position in a middle portion of the elastomer along the length direction of the elastomer. The elastomers are controlled to be curved through the height adjustment mechanism, so that the flexible shaft roller beds 9 become curved. The height adjustment mechanism may be a screw nut mechanism driven by the motor or an electric putter. The structure of the above transitioning and curve forming mechanism 11 has been disclosed in the prior application of the applicant.

The flexible shaft roller beds 9 take the form of middle portion transmission. The middle portion of the flexible shaft roller beds 9 is connected to a roller bed transmission shaft. The roller bed transmission shaft is arranged on the auxiliary rack 5, and a manual driving apparatus 17 is arranged on the auxiliary rack 5. A crank 14 of the manual driving apparatus 17 is rotated to manually drive the roller bed transmission shaft.

Pressing wheel mechanisms 12 are arranged on the auxiliary rack 5. The pressing wheel mechanisms 12 are arranged at an end of the auxiliary rack 5 and fixed to a movable bracket on the upper portion of the auxiliary rack 5. Pressing wheels 20 in the pressing wheel mechanisms 12 and roller wheels on the plurality of flexible shaft roller beds 9 at the outlet side of the transition section 2 are correspondingly arranged up and down to press against an upper surface of the glass. The movable bracket is connected to a lifting apparatus 18, and the lifting apparatus 18 realizes the raising and the lowering of the pressing wheel mechanisms 12 by raising the movable bracket.

The pressing wheel mechanisms 12 further include pressing wheel curve forming mechanisms. A structure of the pressing wheel curve forming mechanism is the same as that of the transitioning and curve forming mechanism 11, which is mainly composed of an elastomer and a curve forming driving mechanism.

In the pressing wheel curve forming mechanism, the elastomer is arranged above the flexible shaft roller bed 9 and is parallel to the flexible shaft roller bed 9. The elastomer is connected to the curve forming driving mechanism. The pressing wheels 20 are arranged at intervals along the length direction of the elastomer. The curve forming driving mechanism is arranged on the movable bracket on the upper portion of the auxiliary rack 5, and the curve forming driving mechanism is configured to control the elastomer to be curved. The pressing wheel 20 may be mounted to the elastomer through a mounting base, or a flexible shaft may be mounted to the elastomer and the pressing wheel 20 is mounted to the flexible shaft.

The curve forming driving mechanism and the height adjustment mechanism adopt the same structure.

An auxiliary heating section 13 is further arranged on the movable bracket on the upper portion of the auxiliary rack 5, and a glass thermal insulation material is arranged on the auxiliary heating section 13.

The forming and curving mechanism of the forming and tempering section 3 includes a transverse curve forming mechanism and a longitudinal curve forming mechanism. The transverse curve forming mechanism is the same as the transitioning and curve forming mechanism 11 of the foregoing transition section, which belongs to the disclosed conventional technologies. For the specific structure, reference may be made to the transitioning and curve forming mechanism and the patent application disclosed by the applicant with the application number CN2019101028914. The longitudinal curve forming mechanism uses a conventional chain plate structure in the art, which is formed by rotatably connecting a plurality of chain plate assemblies in sequence end to end by rotating shafts. Adjacent chain plate assemblies are connected by a single connecting rod. The specific structure of this part can be found in the patent application disclosed by the applicant with the application number CN2019101028914, and the details are not described herein.

Embodiment 2: In this embodiment, the flexible shaft roller beds 9 and the transitioning and curve forming mechanism 11 are arranged in different manners from that in Embodiment 1, and other structures are the same.

In this embodiment, the aluminum profile square tubes 10 are arranged at intervals on the auxiliary rack 5 along the direction perpendicular to the glass conveying direction. The length direction of the aluminum profile square tube 10 is consistent with the glass conveying direction. The flexible shaft roller beds 9 are arranged perpendicular to the aluminum profile square tubes 10. Each flexible shaft roller bed 9 is rotatably mounted to the plurality of aluminum profile square tubes 10 through the roller bed base.

The transitioning and curve forming mechanism 11 adopts a chain plate structure 22 commonly used in the art, which may also be referred to as a toothed plate structure. Two sets of chain plate structures 22 are arranged, which are respectively located on two ends of the aluminum profile square tubes 10 in the length direction. The chain plate structure 22 is mainly composed of a chain plate and a connecting rod that are rotatably connected. The middle portion of the chain plate structure 22 is fixed to the auxiliary rack 5 through an intermediate support 23, and the chain is connected to two ends of the chain plate structure 22. For a specific structure of the part, reference may be made to the prior patent application of the applicant with the application number CN2019101028914.

The chain plate and the aluminum profile square tube 10 are hinged through a spherical hinge 21, and the curve forming motor arranged at the top of the auxiliary rack 5 pulls two ends of the chain plate structure 22 through the chain, so that different aluminum profile square tubes are arranged at different positions, and the flexible shaft roller beds 9 become curved.

Fixing plates for mounting the spherical hinges 21 are arranged on the two ends of the aluminum profile square tubes 10 in the length direction. A ball head of the spherical hinge 21 is arranged on the fixing plate, and a ball socket of the spherical hinge 21 is arranged on a connecting body on the chain plate. Alternatively, the ball head of the spherical hinge 21 is arranged on the connecting body 24 of the chain plate, and the ball socket of the spherical hinge 21 is arranged on the fixing plate.

The technical solution of the present disclosure is further described below by using the production of the double curved tempered glass as an example by using the foregoing device.

FIGS. 7-11 are schematic diagrams of three different methods. In the figure, in order to clearly express a change in the flexible shaft roller beds 9 in each section and transition and engagement between the transition section 2 and the forming and tempering section 3, other structures are omitted, and only relevant roller beds are shown. The way to represent the roller beds is to use different circles to respectively represent end portions of the roller beds and the middle portions of the roller beds. The roller beds include ceramic roller beds 25 in the heating furnace 1 and flexible shaft roller beds 9 in the transition section 2 and the forming and tempering section 3.

Figure 7:
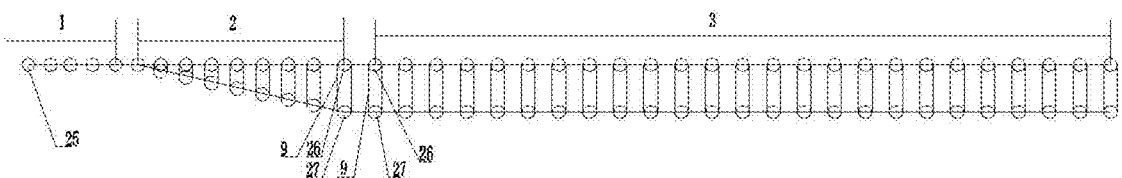
FIG. 7 is a schematic diagram of flexible shaft roller beds before glass enters a forming and tempering section in a first production method of a double curved tempered glass.
Figure 8:
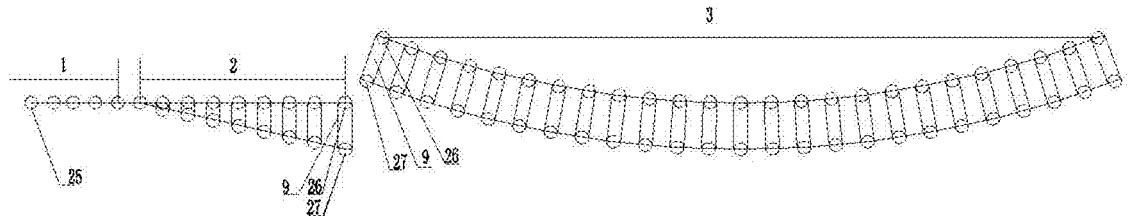
FIG. 8 is a schematic diagram of flexible shaft roller beds after glass enters a forming and tempering section in a first production method of a double curved tempered glass.
Figure 9:
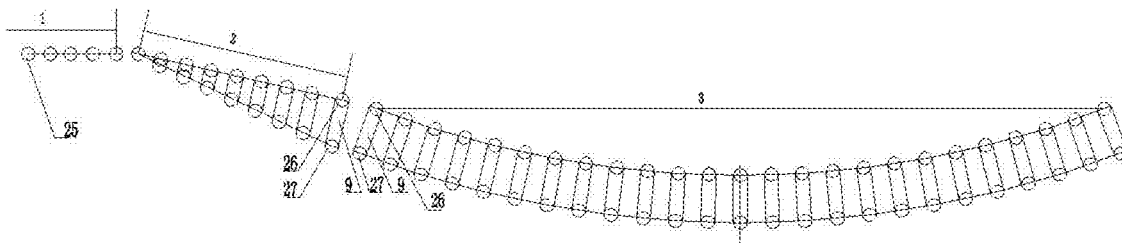
FIG. 9 is a schematic diagram of flexible shaft roller beds in a second production method of a double curved tempered glass.
Figure 10:
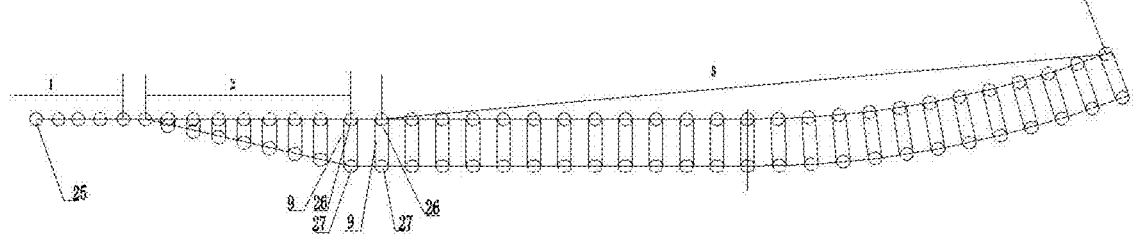
FIG. 10 is a schematic diagram of flexible shaft roller beds before glass enters a forming and tempering section in a third production method of a double curved tempered glass.
Figure 11:
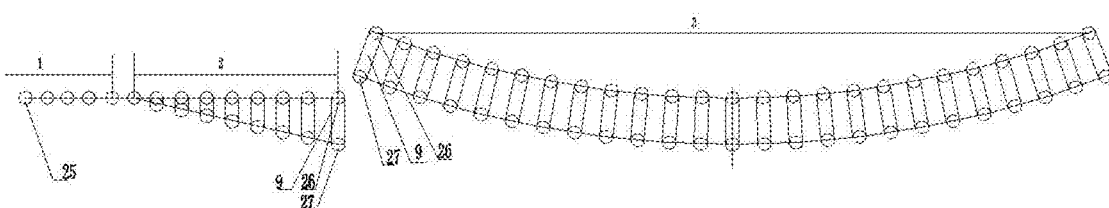
FIG. 11 is a schematic diagram of flexible shaft roller beds after glass enters a forming and tempering section in a third production method of a double curved tempered glass.

In FIGS. 7-11, the ceramic roller beds 25 in the heating furnace 1 are a linear roller beds, and therefore a circle is used to represent one ceramic roller bed 25. In the transition section 2, since the flexible shaft roller beds 9 are required to first become curved in the transverse direction, except the first flexible shaft roller bed 9 being the linear roller bed represented by a circle, for the remaining flexible shaft roller beds 9, an upper circle represents an end portion 26 of the flexible shaft roller bed, and a lower circle represents a middle portion 27 of the flexible shaft roller bed. In addition, as shown in FIG. 7, the auxiliary rack 5 for the transition section 2 has been rotated and smoothly engaged with the forming and tempering section 3 that has been lifted or lowered. In the forming and tempering section 3, the flexible shaft roller beds 9 have become curved in the transverse direction. Therefore, the representation method of the flexible shaft roller beds 9 is the same as that of the transition section 2. That is, the upper circle represents the end portion 26 of the flexible shaft roller bed, and the lower circle represents the middle portion 27 of the flexible shaft roller bed.

A first production method of the double curved tempered glass is as follows. The method relates to FIG. 7 and FIG. 8, and includes the following steps:

First, the first flexible shaft roller bed 9 in the transition section 2 (close to the heating furnace) and the ceramic roller beds 25 in the heating furnace 1 are kept level. The last flexible shaft roller bed 9 in the transition section 2 (away from the heating furnace) and the flexible shaft roller beds 9 in the forming and tempering section 3 have the same transverse curvature after becoming curved in the transverse direction through the transitioning and curve forming mechanism 11, and the transverse curvatures are both target curvatures. In addition, the remaining flexible shaft roller beds 9 of the transition section 2 gradually become curved in sequence according to a transition mode, and the curve forming of the flexible shaft roller beds 9 means that the middle portion of the flexible shaft roller beds 9 is fixed and two sides of the middle portion are raised up to different heights by the corresponding height adjustment mechanism, so as to finish becoming curved. In this case, the end portions of the flexible shaft roller beds 9 are gradually raised in the glass movement direction, and the middle portions of the flexible shaft roller beds 9 are still level with the ceramic roller beds 25 in the heating furnace 1.

Second, the flexible shaft roller beds 9 of the forming and tempering section 3 become curved in the transverse direction through the forming and curving mechanism in the forming and tempering section 3.

Then, as shown in FIG. 4, the auxiliary rack 5 of the transition section 2 is rotated downward, so that the end portion 26 of the flexible shaft roller bed raised during the curve forming is lowered and is on the same level as the first flexible shaft roller bed (as shown in FIG. 7). In this case, the last flexible shaft roller bed 9 in the transition section can be smoothly engaged with the flexible shaft roller beds 9 after becoming curved in the transverse direction in the forming and tempering section 3, thereby eliminating a transition point between the end portion of the flexible shaft roller bed in the transition section and the end portion of the flexible shaft roller bed in the forming and tempering section.

Finally, the glass is discharged from the heating furnace 1, is gradually formed along the transition section 2, and smoothly enters the forming and tempering section 3. After the glass completely enters the forming and tempering section 3, a longitudinal curve forming mechanism of the forming and tempering section 3 becomes curved, thereby finishing formation of the double curved glass and tempering by blowing.

The first method may further be used for formation of single curved glass. In this case, the forming and tempering section 3 is only required to become curved in the transverse direction. After the glass enters the forming and tempering section 3, the glass is not required to become curved in the longitudinal direction, and the rest is processed by using the same method as the above method.

A second production method of the double curved tempered glass is as follows. The method relates to FIG. 9, and includes the following steps:

First, the first flexible shaft roller bed in the transition section 2 (close to the heating furnace) and the ceramic roller beds 25 in the heating furnace 1 are kept level. A transverse curvature of the last flexible shaft roller bed in the transition section 2 (away from the heating furnace) and a transverse curvature of the flexible shaft roller beds of the forming and tempering section 3 are maintained the same through the transitioning and curve forming mechanism 11 and are both target curvatures. In addition, the remaining flexible shaft roller beds in the transition section 2 gradually become curved in sequence according to a transition mode.

Second, the flexible shaft roller beds 9 in the forming and tempering section 3 both become curved in both the transverse direction and the longitudinal direction to achieve the target curvature, and then through the downward rotation of the auxiliary rack 5 of the transition section 2 and raising or lowering of the roller bed surface in the forming and tempering section 3, the last flexible shaft roller bed in the transition section 2 is smoothly engaged with the flexible shaft roller beds in the forming and tempering section 3 after becoming curved, thereby eliminating the transition point between the end portion of the flexible shaft roller bed in the transition section and the end portion of the flexible shaft roller beds in the forming and tempering section.

Finally, the glass is discharged from the heating furnace 1, is gradually formed along the transition section 2, and smoothly enters the forming and tempering section 3, thereby finishing the formation of the double curved glass and tempering by blowing.

A third production method of the double curved tempered glass is as follows. The method relates to FIG. 10 and FIG. 11, and includes the following steps:

First, the first flexible shaft roller bed in the transition section 2 (close to the heating furnace) and the ceramic roller beds 25 in the heating furnace 1 are kept level. A transverse curvature of the last flexible shaft roller bed in the transition section 2 (away from the heating furnace) and a transverse curvature of the flexible shaft roller beds in the forming and tempering section 3 are maintained the same through the transitioning and curve forming mechanism 11 and are both target curvatures. In addition, the remaining flexible shaft roller beds in the transition section 2 gradually become curved in sequence according to a transition mode.

Second, all of the flexible shaft roller beds 9 in the forming and tempering section 3 become curved in the transverse direction, and on the outlet side of the forming and tempering section 3 becomes curved in the longitudinal direction driven by the longitudinal curve forming mechanism. The auxiliary rack 5 of the transition section 2 rotates downward, and the roller bed surface of the forming and tempering section 3 descends, so that the last flexible shaft roller bed in the transition section 2 is smoothly engaged with the flexible shaft roller bed in the forming and tempering section 3 after becoming curved, thereby eliminating the transition point between the end portion of the flexible shaft roller bed in the transition section and the end portion of the flexible shaft roller bed in the forming and tempering section.

Finally, the glass is discharged from the heating furnace 1, is gradually formed along the transition section 2, and smoothly enters the forming and tempering section 3. After the glass completely enters the forming and tempering section 3, the inlet side of the forming and tempering section 3 becomes curved driven by the longitudinal curve forming mechanism, thereby finishing the formation of the double curved glass and tempering by blowing.

In the third method, another manner may further be adopted. That is to say, after the forming and tempering section 3 becomes curved in the transverse direction, the inlet side of the forming and tempering section becomes curved in the longitudinal direction by the longitudinal curve forming mechanism, and after the glass enters the forming and tempering section 3, the outlet side of the forming and tempering section 3 becomes curved in the longitudinal direction by the longitudinal curve forming mechanism. The rest is processed by using the same method as the third method.

The above three methods are several commonly used manners when the flexible shaft roller beds in the transition section become curved in the transverse direction. In addition to the above three manners, there are many manners of tempering and forming the double curved glass by using the forming device of the present disclosure. In all different manners, mainly the curve forming manners of the respective flexible shaft roller beds in the transition section and the forming and tempering section are different. Upon completion of the curve forming, the roller bed surface of the transition section is only required to be rotated according to an actual situation, and the forming and tempering section is correspondingly raised or lowered, so that the roller bed surfaces of the transition section and the forming and tempering section can be smoothly engaged. Then the tempering of the glass is finished according to the normal operation.

The above descriptions of the various embodiments are all based on a fact that the roller bed surface in the transition section is rotatable. During actual implementation, the support configured to mount the flexible shaft roller bed on the transition section can be inclined at a fixed angle. In this case, as long as the inclination angle can satisfy requirements for the formation of the roller bed surface with "the edge portion not moving and the middle portion sinking" after the flexible shaft roller bed in the transition section becomes curved, the purpose of the present disclosure can be achieved through lifting and lowering of the forming and tempering section.

The foregoing descriptions are merely exemplary embodiments of the present disclosure, but are not intended to limit the present disclosure. A person skilled in the art may make various alterations and variations to the present disclosure. Any modification, equivalent replacement, or improvement made within the spirit and principle of the present disclosure shall fall within the protection scope of the present disclosure.

What is claimed is:

1. A method for preparing curved glass, comprising:
   feeding glass into a heating furnace, heating the glass to a softened state, and discharging the glass from the heating furnace,
   entering the glass into a transition section, and preforming and gradually bending the glass in the transition section with two edge portions of the glass in a transverse direction being kept in a same plane and a middle portion of the glass in the transverse direction gradually sinking along a glass conveying direction;
   entering the glass into a forming and tempering section with the two edge portions of the glass in the transverse direction being supported when the glass enters the forming and tempering section from the transition section;
   forming and tempering the glass to complete preparation of the curved glass;
   wherein the method further comprises: adjusting the transition section to make flexible shaft roller beds of the transition section gradually become curved, wherein end portions of the flexible shaft roller beds of the transition section are in the same plane, and middle portions of the flexible shaft roller beds of the transition section are gradually lowered along the glass conveying direction; and adjusting the forming and tempering section to make flexible shaft roller beds of the forming and tempering section curved, wherein the flexible shaft roller beds at an inlet end of the forming and tempering section are smoothly engaged with the flexible shaft roller beds at an outlet end of the transition section, to ensure that the two edge portions of the glass in the transverse direction are supported by the flexible shaft roller beds of the forming and tempering section when the glass enters the forming and tempering section from the transition section; and
   rotating a roller bed surface of the transition section after the flexible shaft roller beds of the transition section become curved, so that the end portions of the flexible shaft roller beds of the transition section are in the same plane and the middle portions of the flexible shaft roller beds of the transition section are gradually lowered along the glass conveying direction; and
   adjusting the height of a roller bed surface of the forming and tempering section after the flexible shaft roller beds of the forming and tempering section become curved, so that a last flexible shaft roller bed of the transition section and a first flexible shaft roller bed of the forming and tempering section are smoothly engaged;
   wherein an upper air grid in the forming and tempering section becomes curved in the transverse direction, or the upper air grid in the forming and tempering section becomes curved in both the transverse direction and a longitudinal direction; and
   wherein the flexible shaft roller beds of the forming and tempering section are adjusted by a forming and curving mechanism wherein:
   the forming and curving mechanism comprises a transverse curve forming mechanism and a longitudinal curve forming mechanism;
   the flexible shaft roller beds of the forming and tempering section become curved in the transverse direction by the transverse curve forming mechanism; and a plurality of the flexible shaft roller beds on an inlet side or an outlet side of the forming and tempering section become curved in a longitudinal direction by the longitudinal curve forming mechanism, so that a roller bed surface formed by the plurality of the flexible shaft roller beds on the inlet side or the outlet side of the forming and tempering section is preformed into a spherical surface for carrying the glass.

2. The method for preparing curved glass according to claim 1, wherein the flexible shaft roller beds of the transition section are mounted on a support that is inclined at a fixed angle, so that the end portions of the flexible shaft roller beds of the transition section are in the same plane and the middle portions of the flexible shaft roller beds of the transition section are gradually lowered along the glass conveying direction.

3. The method for preparing curved glass according to claim 1, wherein the flexible shaft roller beds of the transition section gradually become curved in the transverse direction by a transitioning and curve forming mechanism.

4. The method for preparing curved glass according to claim 1, wherein the end portions of the flexible shaft roller beds of the transition section are kept in a same horizontal plane before and after the flexible shaft roller beds of the transition section gradually become curved.

5. The method for preparing curved glass according to claim 1, wherein when the flexible shaft roller beds of the transition section and the flexible shaft roller beds of the forming and tempering section become curved in the transverse direction, a first flexible shaft roller bed of the transition section is level with roller beds of the heating furnace, and a last flexible shaft roller bed of the transition section and the flexible shaft roller beds of the forming and tempering section have a same transverse curvature in the transverse direction.

* * * * *